Nov. 25, 1952 W. E. BROWN 2,619,392
PISTON
Filed Jan. 30, 1951

INVENTOR.
WILLIAM E. BROWN
BY
Mellin and Hanscom
ATTORNEYS

Patented Nov. 25, 1952

2,619,392

UNITED STATES PATENT OFFICE 2,619,392

PISTON

William E. Brown, Sacramento, Calif.

Application January 30, 1951, Serial No. 208,642

6 Claims. (Cl. 309—15)

This invention relates to pistons for internal combustion engines and in general has for its object the provision of a piston so constructed that a metal-to-metal seal between the piston and its cylinder is maintained throughout its entire cycle of operation.

Conventionally, a seal between a piston and its associated cylinder is effected by means of piston rings accommodated in annular grooves formed in the piston and having slight frictional engagement with the walls of the cylinder. Since the piston rings must be free to move within their grooves, they are made to loosely fit therein, an oil seal or dam being relied upon to prevent the bypass of oil and gases behind the rings. This expedient, however, is objectionable, for since the film or body of oil at this point is stagnant and subjected to the high temperatures developed during the working stroke of the piston, it carbonizes within a relatively short time. As is well known, the resulting carbon restricts the movement of the rings within their grooves. This in turn, of course, results in the leakage of gases past the rings and into the crankcase with the consequent dilution of the crankcase oil. Furthermore, oil from the crankcase seeks its way through the rings into the combustion chambers of the engine, thereby further lowering the efficiency of its operation.

More specifically, the object of this invention is the provision of a piston comprising: a piston body, a piston head resiliently mounted on the piston body for limited axial movement relative thereto, and a set of rings mounted between the piston body and the piston head, at least one of these rings having sealing engagement with the piston head, and with the next adjacent ring and the latter ring having sealing engagement with the walls of the cylinder associated with the piston.

A further object of this invention is the provision of a piston of the character above described wherein the set of rings referred to is subjected to an axial pressure under the control of the relative axial movement between the piston and its piston head.

A principal object of the present invention is to provide a piston assembly wherein the high gas pressures in the combustion chamber are sealed off from behind the piston rings so as to reduce the pressures of the rings against the cylinder walls, and thereby reduce friction and wear of both contacting surfaces.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings.

Figure 1:
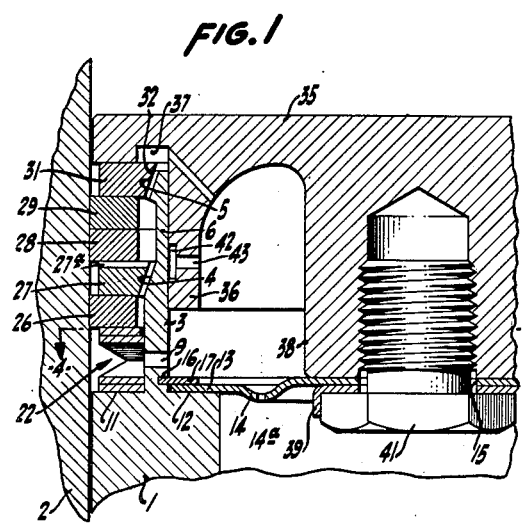
Fig. 1 is a vertical mid-section taken through a piston and its associated cylinder embodying the object of my invention.

The piston as illustrated in these figures comprises a hollow piston 1 operatively disposed within a cylinder 2 and provided with an upwardly extending cylindrical piston extension 3. As shown in Fig. 1 the outer diameter of the piston extension 3 is smaller than the outer diameter of the piston, and its inner diameter is greater than the inner diameter of the piston. Formed on the outer surface of the piston extension 3 are axially spaced, radially inclined ring seats 4 and 5, the intervening piston extension wall 6 being of reduced diameter. The inclination of these seats with respect to the vertical can be in the order of 20°. Formed in the ring seat 5 are peripherally spaced oil channels 7 merging with radial channels 8 located on the upper end of the piston extension. Extending through the lower end of the piston extension 3 are radial oil holes 9, located somewhat above the outer and inner shoulders 11 and 12 formed by the upper end of the piston body 1 on either side of the piston extension.

Figure 4:
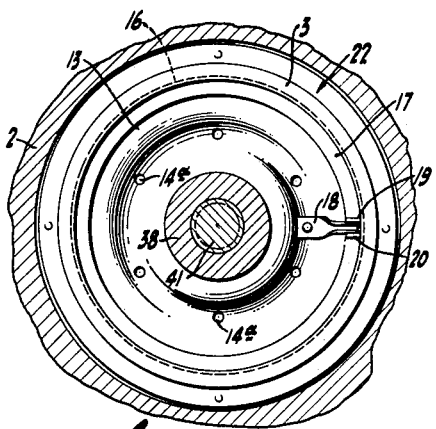
Fig. 4 is a horizontal section taken on the section line 4—4 of Fig. 1.
Figure 2:
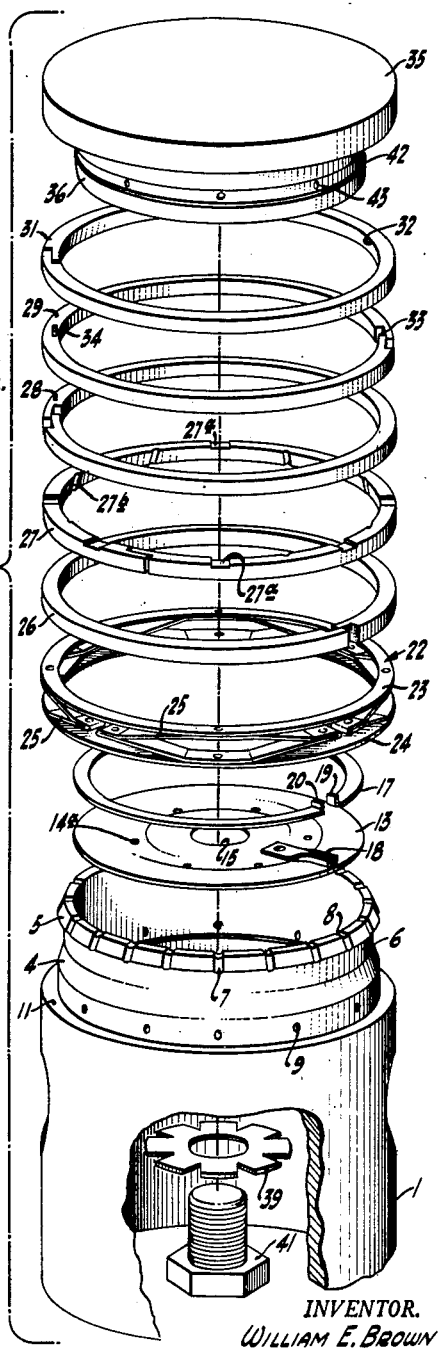
Fig. 2 is an exploded view of the piston shown in Fig. 1.

Seated on the inner shoulder 12 of the piston 1 is a spring disc 13 provided with an intermediate channel 14 and formed with a circle of oil holes 14a and with a central bolt opening 15. Seated over the disc 13 and extending into a channel 16 formed in the piston extension 3 is a split lock ring 17. As shown in Figs. 2 and 4 the disc 13 is provided with a locking finger 18, the outer end of which extends between upwardly extending flanges 19 and 20 formed on the ends of the lock ring 17.

Figure 3:
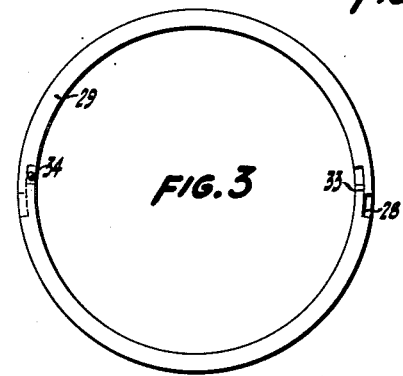
Fig. 3 is a top plan view of the second ring (from the top) of the stack of piston rings as shown in Figs. 1 and 2.

Seated on the outer shoulder 11 of the piston 1 is an annular compression spring generally designated by the reference numeral 22. As best shown in Fig. 2, this compression spring includes upper and lower metal rings 23 and 24 each secured to a plurality of intermediate symmetrically constructed and disposed loop springs 25. As shown in Fig. 1, there is clearance between the inner periphery of metal ring 23 and piston extension 3 to permit free upward circulation of oil. Mounted on the upper end of this compression spring is a split oil wiping ring 26 of conventional construction having a normal outer diameter slightly greater than the outer diameter of the piston body 1, and an inner diameter substantially greater than the outer diameter of the piston extension 3. Disposed above the oil ring 26 in surface engagement therewith is a pressure ring 27 having an inner surface complementary to the inclined seat 4 so as to snugly seat thereon, the outer diameter of this ring being substantially less than the outer diameter of the piston body 1, and its normal inner diameter being such that it is always under a slight tension. As best shown in Fig. 2, the ring 27 is provided on its upper surface with oil passageways 27a and on its inner inclined surface with peripherally spaced oil passageways 27b. Mounted on the ring 27 is a pair of piston rings 28 and 29 of conventional construction, both of these rings having an outer diameter normally slightly greater than the outer diameter of the piston body 1 and having an inner diameter substantially greater than the outer diameter of the piston extension 3 at this point. The lower surface of the ring 28 is in sealing engagement with the upper surface of the ring 27 and its upper surface is in sealing engagement with the ring 29. Seated on the ring 29 under slight tension is a compression ring 31 which, like the compression ring 27, is provided with an inner inclined surface 32, complementary to the inclined surface 5 so as to have sealing engagement therewith. The outer diameter of this ring is substantially equal to the outer diameter of the ring 27, thereby always to provide positive clearance with the walls of the cylinder 2. Each of the rings 28 through 31, inclusive, is provided with an offset or labyrinth type of joint 33 to preclude radial leakage therethrough. As shown in Figs. 2 and 3, the ring 29 is provided at a point diametrically opposed to joint 33 with a longitudinally extending pin 34, the upper end of this pin being accommodated within the offset joint of the ring 31 and its lower end being accommodated within the offset joint of the ring 28, thereby to prevent the joints of these three rings from registering with each other.

Seated on the ring 31 is a piston head 35 formed with a downwardly extending sleeve 36 in sliding engagement with the piston extension 3 and formed on its lower surface with an oil channel 37. Also extending downwardly from the head 35 is a central internally threaded boss 38. The lower end of the boss is seated on the central portion of the disc 13 and is secured thereto by a lock washer 39 and a bolt 41. Lock washer 39 preferably has an inside lug (not shown) to fit into an accommodating slot (not shown) in the piston head boss to prevent washer rotation. Formed on the outer periphery of the sleeve 36 is an oil channel 42 communicating through radially extending, peripherally spaced holes 43 with the interior of the sleeve.

The dimensions and characteristics of the disc spring 13 should be so correlated with the engine with which it is designed to operate, that it moves downwardly a distance in the order of $\frac{1}{32}$ of an inch in response to the peak pressure to which its associated piston head is subjected. The annular compression spring 22 should be of sufficient strength to maintain the stack of rings mounted above it in slight compression against the lower face of the piston head 35 without unduly limiting the radial expansion of these rings. The compression rings 27 and 31 should be of such dimensions that they do not engage the walls of the cylinder 2 as shown in the drawings.

As a result of this construction, it will be seen that the upper face of the ring 31 is in sealing surface engagement with the lower face of the piston head 35 and that the lower face of this ring is in sealing surface contact with the upper face of the ring 29. The two rings 28 and 29 are in turn in sealing surface engagement with each other and their outer peripheral surfaces are in sealing surface engagement with the walls of the cylinder 2. Upon the ignition of fuel within the cylinder 2 above the piston head 35, the piston head, under the influence of the resulting pressure, will move downwardly relative to the piston body 1, a total distance in the order of $\frac{1}{32}$ of an inch against the action of the spring disc 13. It will therefore be seen that a portion of the energy of the compression gases has been momentarily absorbed by the disc spring 13. However, the energy so imparted to the spring will be immediately released thereby as soon as the pressure above the piston head has passed its peak. Concurrently with the downward movement of the piston head 35 relative to the piston body 1, the compression ring 31 moves downwardly on its inclined seat 5 against its own resiliency, thereby slightly compressing the piston rings 28 and 29 against the ring 27. The downward movement of the rings 28 and 29 is imparted to the rings 27 and 26 against the resiliency of the ring 27 and the spring 22. Each axial movement of the rings 27 and 31 is, of course, accompanied by a radial expansion and contraction thereof over the immediately adjacent surfaces which serves to aid in preventing the piston rings 28 and 29 from sticking.

This whole system is maintained lubricated by oil passing upwardly between the piston body 1 and the cylinder 2 to the channel defined by the piston body shoulder 11 and the lower face of the ring 26. Oil from this channel passes upwardly between the ring 26 and the piston extension 3 and through the channels 27b to a point above the ring 27. From this point the oil can move radially outwardly through the channels 27a of the ring 27 and upwardly between the inner surfaces of the rings 28 and 29 and the outer surface of the piston extension 3 into the channels 7 and 8 formed in the upper end of the piston body extension so as to lubricate the interior surface of this extension. Oil can also pass inwardly and outwardly through the oil holes 9 and through the oil holes 43 into the annular channel 42. In this fashion all of the surfaces of the various parts of this assembly are maintained lubricated with a film of oil but without entrapment of stagnant oil at any point in direct contact with the hot gases from the combustion chamber.

The above construction avoids the necessity of mounting piston rings with positive clearance in conventional piston ring grooves and, consequently, avoids the necessity of resorting to an oil seal or dam between such rings and its grooves. The presence of stagnant oil at points at which such oil would be in direct contact with the hot gases is therefore avoided and perforce the carbonization of such oil adjacent the rings. Furthermore, this assembly permits of a substantially free radial expansion of the piston rings at all times without danger of their sticking and without the scoring or wear of the cylinder walls which usually occurs as a result of sticking oil rings.

By the above construction, the high gas pressures in the combustion chamber are sealed off from behind the rings so that the rings bear against the cylinder walls with considerably less pressure than in prior constructions. It will be appreciated that this lessening of the pressures of the piston rings against the cylinder walls lessens wear of both the piston rings and the cylinder walls and makes possible the use of steel piston rings. In prior constructions, the piston rings were made of a relatively soft material, such as cast iron and the like, in order to obtain a low coefficient of friction. Even so, the high gas pressures behind these rings resulted in their rapid wear. In my construction, where the gas pressures are sealed off from behind the rings, steel piston rings which resist wear better than cast iron and are more resilient and less prone to breakage can be used. The frictional force of steel piston rings against the cylinder walls will be less than in prior constructions, even though steel has a higher coefficient of friction than cast iron and the like, because of the sealing off function of my construction.

Although the particular construction shown discloses a pair of piston rings, it will be appreciated that a construction embodying the concepts of my present invention could be built having a single piston ring sandwiched between the pressure rings, and other constructions could be built using more than two piston rings.

Having thus described my invention, what I claim and desire to secure by Letters Patent is:

1. A piston assembly comprising: a piston body; a piston body extension extending upwardly from said piston body, said extension being provided on its side walls with upper and lower axially spaced, inclined pressure ring seats, one of said seats being located at the upper end of said extension; upper and lower split pressure rings seated respectively on said upper and lower seats, said pressure rings having surfaces complementary to said seats; a pair of split piston rings mounted between said upper and lower pressure rings in surface engagement with each other and with said pressure rings, the normal outer diameter of said piston rings being slightly greater than the inner diameter of the cylinder in which said piston is designed to operate; a piston head seated on said upper pressure ring and resiliently supported by said piston; and means disposed between said piston body and said lower pressure ring for upwardly biasing said lower pressure ring.

2. A piston assembly comprising: a piston body; a piston body extension extending upwardly from said piston body, said extension being provided with upper and lower, axially spaced, inclined pressure ring seats; a resilient piston head support mounted on and secured to said piston body; upper and lower split pressure rings seated respectively on said upper and lower seats, said pressure rings having inner inclined surfaces complementary to said seats; a pair of split piston rings sandwiched between said pressure rings, the normal outer diameter of said piston rings being slightly greater than the inner diameter of the cylinder in which said piston is designed to operate; a piston head seated on said upper pressure ring, said piston head being mounted on and secured to said resilient piston head support; and means disposed between said piston body and said lower pressure ring for upwardly biasing said lower pressure ring.

3. A piston assembly comprising: a piston body; a piston body extension extending upwardly from said piston body, said extension being provided with upper and lower, axially spaced, inclined pressure ring seats; a resilient piston head support fixed to said piston body; upper and lower split pressure rings seated respectively on said upper and lower seats, said pressure rings having inner inclined surfaces complementary to said seats; a pair of split piston rings sandwiched between said pressure rings, the normal outer diameter of said piston rings being slightly greater than the inner diameter of the cylinder in which said piston is designed to operate; a piston head seated on said upper pressure ring, said piston head being provided with a downwardly extending sleeve having a sliding fit within said piston body extension and with a downwardly extending boss fixed to said resilient piston head support; and resilient means disposed between said piston body extension and said lower pressure ring for upwardly biasing said upper pressure ring and in turn slightly compressing said piston rings between said upper and lower pressure rings.

4. A piston assembly comprising: a piston body; a piston body extension extending upwardly from said piston body, said extension being provided with upper and lower, axially spaced, inclined pressure ring seats; a spring disc mounted on and secured to said piston body adjacent the upper end thereof; an annular compression spring seated on the upper end of said piston body; an oil wiper ring seated on said annular compression spring; a lower split compression ring mounted on said oil wiper ring; lower and upper piston rings seated on said lower compression ring; an upper compression ring seated on said upper piston ring, said upper and lower compression rings being provided with inner inclined edges complementary to and in resilient engagement with said upper and lower piston body extension seats; and, a piston head seated on said upper compression ring, said piston head being provided with a depending sleeve in sliding engagement with said piston body extension and with a depending boss secured at its lower end to said spring disc; all of the elements of said assembly being so correlated that said piston rings are maintained under a slight compression between said upper and lower compression rings and that said upper compression ring is slightly compressed by said piston head.

5. A piston assembly comprising: a hollow piston body provided with a coaxial cylindrical piston extension having an outer diameter substantially smaller than the outer diameter of said piston body; upper and lower axially spaced inwardly inclined pressure ring seats formed on the outer surface of said piston extension; a resilient piston head support mounted on said piston at the base of said piston extension; an annular compression spring mounted on said piston extension and supported on said piston body; a first split wiper ring seated on said compression spring, diameter of said first split ring being normally at least as great as the outer diameter of said piston body and the inner diameter of said first split ring being substantially smaller than the outer diameter of soid piston extension; a first split pressure ring mouned on said first piston ring, the inner surface of said pressure ring being complementary to and in engagement with said first inclined pressure ring seat the outer diameter of said compression ring being substantially less than the outer diameter of said piston body; a pair of stacked, split piston rings mounted on said first compression ring, the outer diameters of said piston rings being at least as great as the outer diameter of said piston body and said piston rings having positive clearance with said piston extension; a second pressure ring mounted on said piston rings, the inner surface of said pressure ring being complementary to and in engagement with the surface of said second pressure ring seat and the outer diameter of said second pressure ring being substantially smaller than the diameter of said piston body; a piston head seated on said second pressure ring, said piston head being provided with a cylindrical skirt slidable within said piston extension; and means for securing said piston head to said resilient piston head support.

6. A piston assembly comprising: a piston body; a piston body extension extending upwardly from said piston body, said extension being provided on its side walls with upper and lower axially spaced, inclined pressure ring seats, one of said seats being located at the upper end of said extension; upper and lower split pressure rings seated respectively on said upper and lower seats, said pressure rings having surfaces complementary to said seats; at least one split piston ring mounted between said upper and lower pressure rings in surface engagement with each other and with said pressure rings, the normal outer diameter of said piston rings being slightly greater than the inner diameter of the cylinder in which said piston is designed to operate; a piston head seated on sad upper pressure ring and resiliently supported by said piston; and means disposed between said piston body and said lower pressure rings for upwardly biasing said lower pressure rings.

WILLIAM E. BROWN.

REFERENCES CITED

The following references are of record in the file of this patent:

UNITED STATES PATENTS

| Number | Name | Date |
|---|---|---|
| 859,328 | McMullen | July 9, 1907 |
| 1,129,396 | Jacobs | Feb. 23, 1915 |
| 2,004,618 | Schmidt | June 11, 1935 |